United States Patent [19]
Berry et al.

[11] Patent Number: 5,596,875
[45] Date of Patent: Jan. 28, 1997

[54] SPLIT STIRLING CYCLE CRYOGENIC COOLER WITH SPRING-ASSISTED EXPANDER

[75] Inventors: Robert L. Berry, Ashville, N.C.; Gerald R. Pruitt, San Pedro, Calif.

[73] Assignee: Hughes Aircraft Co, Los Angeles, Calif.

[21] Appl. No.: 513,647

[22] Filed: Aug. 10, 1995

[51] Int. Cl.$^6$ .................................................. F25B 9/00
[52] U.S. Cl. .................................................. 62/6; 62/520
[58] Field of Search .................................. 62/6; 60/520

[56] References Cited

U.S. PATENT DOCUMENTS

| | | | |
|---|---|---|---|
| 4,754,608 | 7/1988 | Bertsch | 62/6 |
| 4,822,390 | 4/1989 | Kazumoto et al. | 62/6 |
| 4,922,722 | 5/1990 | Kazumoto et al. | 62/6 |

*Primary Examiner*—Ronald C. Capossela
*Attorney, Agent, or Firm*—Elizabeth E. Leitereg; Terje Gudmestad; Wanda K. Denson-Low

[57] ABSTRACT

A split Stirling cycle type of cryogenic cooler (10) includes a compressor portion (12) and an expander portion (14). The expander portion (14) is of the "cold finger" type, and is configured to operate in near-resonance with the characteristic cyclic operating rate of the compressor portion (12). As a result, an improved performance of the cooler results both during cool down from ambient temperatures and after cool down. Additionally, a quiet operation of the cooler is provided both during and after cool down to cryogenic temperatures.

9 Claims, 1 Drawing Sheet

SPLIT STIRLING CYCLE CRYOGENIC COOLER WITH SPRING-ASSISTED EXPANDER

BACKGROUND OF THE INVENTION

1. Field of the Invention

This invention is in the field of cryogenic coolers of the split Stirling cycle type. More particularly, this invention relates to a cryogenic cooler with an expander portion of the cold-finger configuration; and having a reciprocable spring/mass system defined in the expander portion of the cooler by the combination of a displacer-drive piston, and a resilience. The spring/mass system includes a combined pneumatic and mechanical spring, and the reciprocable mass includes a drive piston and displacer assembly. The spring/mass system is in near-resonance with the operating cyclic rate of a compressor portion of the cryogenic cooler.

2. Related Technology

Conventional cryogenic coolers of the split Stirling cycle cold finger configuration generally include a compressor alternately supplying and withdrawing pressurize gas, such as high pressure helium gas, to and from an expander portion of the cooler. The expander portion of the cooler defines the "cold finger" portion of the cryogenic cooler, and include a drive part from which extends the elongate finger portion having a distal end portion with an end surface. This distal end portion, and particularly the end surface, is cooled to cryogenic temperatures by operation of the expander. Another portion of the expander near the proximal end of the cold finger is warmed above ambient temperature by operation of the expander. Heat withdrawn from the cooled portion of the expander, as well as heat resulting from mechanical inefficiency of the expander, is rejected to ambient at this warm portion of the expander. These conventional cold finger expanders generally include one of three alternative mechanizations for reciprocally driving the moving mass of the expander in response to the cyclical supply and withdrawal of high pressure gas to and from the expander by the compressor portion of the cryogenic cooler.

One of the conventional mechanizations for such cold finger expanders includes a pneumatic drive piston to drive the displacer in reciprocation. This pneumatic-spring type of drive mechanization essentially employs the conventional pneumatic bounce piston concept to reciprocally drive the displacer. One portion of the pneumatic piston is exposed to the high pressure gas from the compressor, which varies in pressure as the compressor supplies and withdraws this gas. Another portion of the pneumatic piston is exposed to the gas pressure in a substantially closed chamber, which gas pressure also varies as the drive piston reciprocates. The drive piston reciprocates between first and second positions according to the force balance on the portions of the piston, and according to the effective pressures in the closed chamber and as supplied by the compressor.

The conventional displacer drive with a pneumatic piston gives good cryogenic performance, but is usually noisy during cool down from ambient to cryogenic temperatures. This may be the case because the reciprocating mass is not stabilized within the expander, is over driven by the compressor, and impacts the end walls of the expander during cool down. Some cryogenic coolers of this type also continue to be noisy after achieving cryogenic temperature at the cold finger.

An alternative mechanization for the displacer drive of a split Stirling cycle cryogenic cooler includes a spring/mass system with a mechanical spring disposed in the working volume of the expander, and a piston to which the varying gas pressure from the compressor is applied. The spring/mass system is usually arranged to be in near-resonance at the cyclic operating rate of the compressor. These spring-drive coolers are generally quiet both during cool down and after achieving cryogenic temperatures at the cold finger. However, this design of cooler also suffers from an inherently lower efficiency of the expander because of a larger dead volume connecting to the working chamber of the expander. In other words, the expander has a lower compression ratio in conjunction with the compressor. Such is the case because the volume necessary to house the mechanical spring connects to the working chamber of the expander, and lowers the effective compression ratio of the compressor-expander combination. These cryogenic coolers accordingly have a lower efficiency of performance in terms of watts of cooling compared to watts of drive power applied at the compressor. Also, the warmed heat-rejecting portion of the expander has a higher operating temperature than the pneumatic-piston type of expander due in large extent to unusable heat of compression that takes place in the added void volume in which the springs of the expander mechanism are located.

Yet another type of expander drive mechanization for the cold finger of a split Stirling cycle cryogenic cooler includes the use of a pneumatic piston to drive the displacer, in combination with a pair of centering springs to stabilize the center position of reciprocation of the displacer after cool down. Conventionally, this spring-centered type of drive mechanization would not operate at near-resonance with the cyclic operation rate of the compressor, and the centering springs would be isolated from the working volume of the expander. This latter type of expander drive mechanization has good cryogenic performance, which is generally comparable favorably to the pneumatic drive piston expanders. Expanders of this type are quiet after cool down, but suffer from being noisy during cool down from ambient to cryogenic temperatures. This increased noise of operation during cool down is believed to be due to the same over driving of the expander and drive piston which applies to the pneumatic-piston types of expanders. Again, the piston and expander are believed to impact with the end walls of the expander portion of the cooler because the spring rates of the centering springs are not sufficient to control the excursions of the expander and piston during start up and cool down.

SUMMARY OF THE INVENTION

In view of the deficiencies of the conventional technology, a cryogenic cooler with a cryogenic expander is needed which has an improved cryogenic performance, which improved performance is as good as or better than the pneumatic-piston and spring-centered expanders.

Such a cryogenic cooler should be quiet in its operation after cool down, and especially during cool down from ambient to cryogenic temperatures like the spring-drive type of expanders.

An object for this invention is to provide a cryogenic expander having an improved efficiency of cryogenic performance.

Yet another object for this invention is to provide a cryogenic expander which is relatively quiet in its operation, both during and after cool down.

Another object for this invention is to provide a cryogenic expander having an increased cooling capacity during cool down because of the improved efficiency of operation during this phase in comparison to the spring-centered and pneumatic piston type of expanders.

An object for this invention is to provide a cryogenic expander in which the warmed portion of the expander has a lower operating temperature in comparison to spring driven types, due to the elimination of unusable heat of compression in the spring drive region of the expander.

Accordingly, the present invention provides a split Stirling cycle cryogenic cooler including a compressor portion reciprocally discharging and receiving pressurized gas at a characteristic cyclic operation rate; an expander portion receiving the pressurized gas from the compressor portion to reciprocally drive a gas displacer member, the expander portion including a housing within which is reciprocable a drive piston, the drive piston having a pressure-responsive face exposed to the pressurized gas from the compressor to drive the drive piston in reciprocation within the housing and sealingly cooperating with the housing to define a substantially closed pneumatic chamber. The drive piston also has another pressure-responsive face exposed to the gas pressure prevailing within the pneumatic chamber to exert a resilient gas force upon the drive piston; the gas displacer member drivingly couples with the drive piston for reciprocation in unison therewith, and the gas displacer member reciprocating within an elongate bore defined by the housing. This displacer also includes a gas regenerator member, the gas displacer member cooperating with the housing and with the regenerator member to move heat energy from one portion of the housing to another portion thereof by Stirling cycle operation in response to reciprocation of the drive piston and resulting gas displacement through the regenerator and within the housing portions. A centering spring is disposed within the pneumatic chamber and extends between the housing and a spring seat member coupled drivingly with the drive piston for both applying a resilient centering force upon the drive piston and gas displacer member, and also adds a resilient spring force to the resilient gas force, whereby the spring/mass system defined by the resilient gas force in combination with the resilient spring force both applied to the drive piston, the gas regenerator member, and the spring seat member in combination has a resonant frequency substantially the same as the characteristic cyclic operation rate of the compressor portion.

Additional objects and advantages of the present invention will be apparent from a reading of the following detailed description of a single exemplary preferred embodiment of the invention, taken in conjunction with the following drawing Figures.

BRIEF DESCRIPTION OF THE DRAWING FIGURES

FIG. 1 provides a somewhat schematic view of a split Stirling cycle cryogenic cooler including an expander portion, which expander portion is depicted in longitudinal view and partially in cross section; and FIG. 2 is a tabulation comparing performance of a cryogenic cooler embodying the invention to the performance of conventional cryogenic coolers.

DETAILED DESCRIPTION OF AN EXEMPLARY PREFERRED EMBODIMENT OF THE INVENTION

Figure 1:
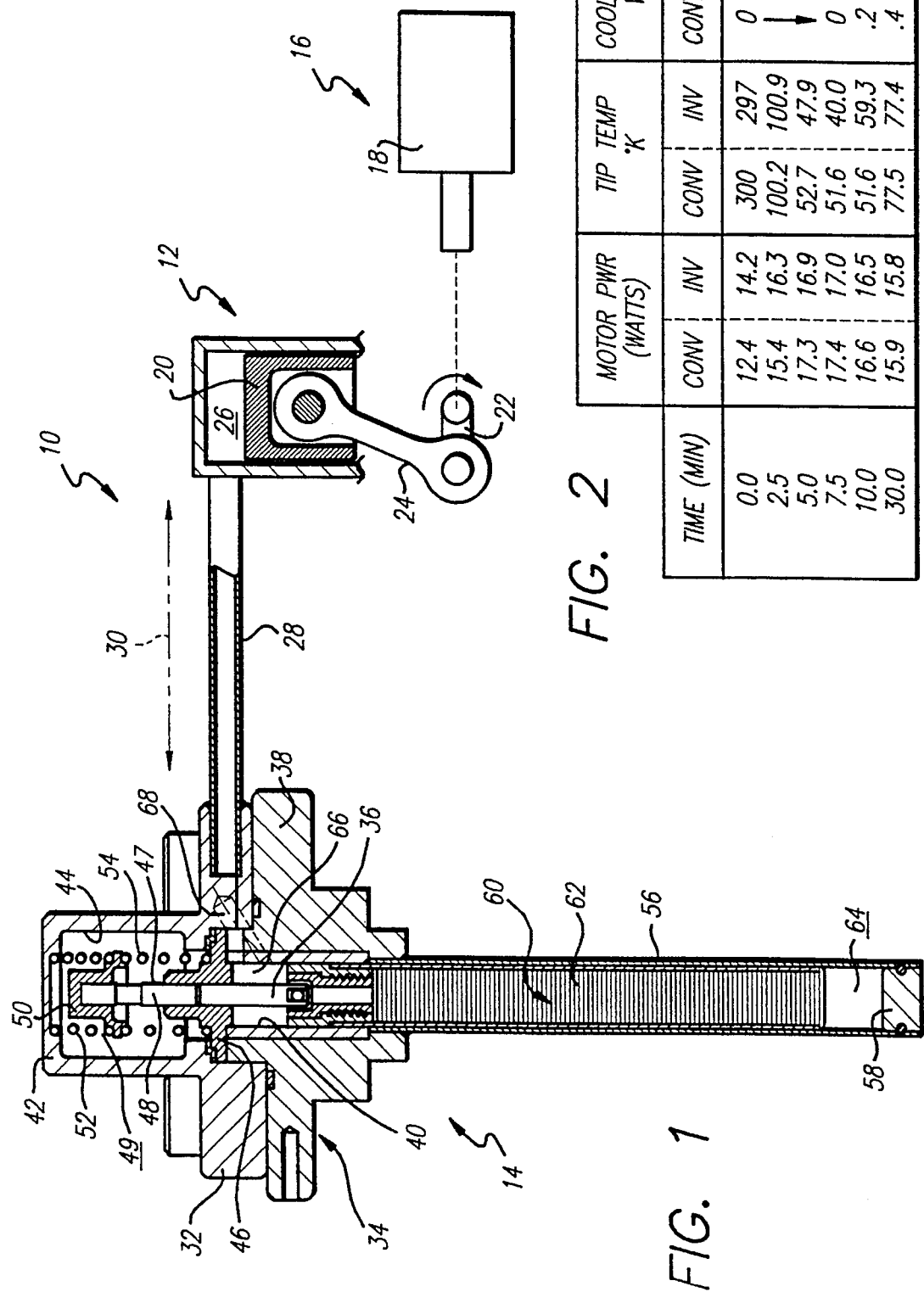

FIG. 1 illustrates a cryogenic cooler apparatus 10 having a compressor portion 12, and an expander portion 14. The compressor portion 12 is conventional, and includes a power drive 16, such as an electrically driven linear or rotary motor. For purposes of illustration and explanation, the power drive 16 is illustrated as including a rotary motor 18 reciprocally driving a piston 20 by means of a crank shaft 22 and connecting rod 24. The reciprocable piston 20 expands and contracts a variable-volume chamber 26 as it is driven by the motor 18. Consequently, pressurized gas is alternately ejected from and drawn back into the chamber 26 via a connecting conduit 28, as is depicted schematically on FIG. 1 by the double-headed arrow 30, and the sinusoidal wave form. In fact, the compressor portion 12 provides a substantially sinusoidal driving force to the expander portion 14 via the supplying and withdrawing of pressurized gas through the conduit 28. Collectively, the power drive 16 is also conventionally referred to as a compressor, although it simply discharges to and then receives pressurized gas from the conduit 28 on an alternating and cyclical basis. Conventionally, the pressurized gas is high pressure helium.

Chamber 26 and conduit 28 communicate pressurized gas reciprocally to and from the expander portion 14 of the apparatus 10. The expander portion 14 includes a housing 32 including a respective drive portion 34, which converts the reciprocating gas flow provided by the compressor portion 12 into mechanical reciprocation of a displacer member 36 of the expander. Viewing FIG. 1 more particularly, it is seen that the housing 32 includes a base part 38 defining a stepped through bore 40. A cap part 42 is sealingly secured to the base part, and also defines a recess 44 generally aligned with the bore 40. Sealingly captured between the base part 38 and the cap part 42 is an annular guide member 46. Guide member 46 similarly defines a through bore 47 coaxial with the bores 40 and 44. Sealingly and reciprocally carried in the bore 47 is an elongate piston member 48.

The piston member 48 cooperates with the guide member 46 and cap member 42 to define a substantially closed pneumatic chamber 49. Within the chamber 49, the piston member 48 carries a spring seat member 50. A pair of coil compression springs 52 and 54 extend in opposite directions from the spring seat member 50 to respectively engage the cap member 42 and guide member 46. These springs 52, 54 work in opposition to one another so that the centered position of the piston member 48 is as is depicted in FIG. 1. However, the piston member 48 is free to reciprocate in the bore 47, as will be further explained. It will be understood that as the piston member 48 reciprocates in the bore 47, the volume of the chamber 49 expands and contracts. Because the chamber 49 is substantially closed by the close sealing relationship of the piston 48 in bore 47, the gas pressure in chamber 47 varies in response to reciprocation of the piston 48, and applies a pneumatic spring force to this piston member 48.

Further considering FIG. 1, it is seen that the expander portion housing 32 includes an elongate tubular extension member, or "cold finger" portion 56. This cold finger portion 56 is sealingly secured at one end thereof in the bore 40 of the base part 38. At the opposite end, an end wall member 58 is sealingly secured in the tubular extension member 56. Slidably carried in the tubular extension member 56 is an elongate similarly tubular displacer body 60 of the displacer 36. This displacer body 60 along with a regenerator material packing 62 carried therein defines the displacer 36. The regenerator material packing 62 is effectively a gas-permeable heat exchange and storage material. Examples of regenerator packing materials are: a stack of metallic screens, or a packing of metallic balls. In each case, the regenerator material allows gas flow therethrough, exchanges heat energy with the flowing gas, and stores or releases heat energy dependent upon the temperature of the gas flow through the regenerator. With a typical screen packed regenerator, the differential gas pressure which can be maintained across the regenerator material is only a few pounds per square inch during dynamic conditions of operation of the expander portion 14. The displacer member 36, including tubular displacer body 60 and regenerator material 62 therein, cooperate with the finger 56 and end wall 58 to define a cooling chamber 64.

At the opposite end of the finger 56, the displacer member 36, drive piston 48, guide member 46, and housing 32 with bore 40 and recess 44, all cooperate to define a working chamber 66. This working chamber 66 is communicated with the conduit 28 by a flow path indicated with the numeral 68. So far as fluid flow is concerned, the working chamber 66 is separated from the cooling chamber 64 only by the length and slight flow resistance of the regenerator material 62 carried in the displacer body 60 of the displacer 36. However, as those who are ordinarily skilled in the pertinent arts will recognize, when the compressor portion of the split Stirling cycle cryogenic cooler cyclicly applies and withdraws pressurized gas from the working chamber 66, the displacer 36 moves in opposition to the gas pressure in chamber 66. That is, the differential pressure between chamber 66 and chamber 49 is such that the displacer 36 moves upward in response to increasing pressure in chamber 66, and moves downward in response to decreasing pressure in this chamber.

Thus, chamber 66 contracts while cooling chamber 64 expands in response to the positive cycle (gas delivery) of the sinusoidal pressure wave from compressor portion 12. On the other hand, cooling chamber 64 contracts while working chamber 66 expands in response to the negative cycle (gas withdrawal) portion of the sinusoidal pressure wave from compressor portion 12. At the same time that the chambers 64 and 66 are expanding and contracting in opposition, with the chamber 64 being out of phase with the pressure wave from compressor portion 12, warm and cool gas flows back and forth through the regenerator material 62. This material serves as a heat exchange medium, absorbing warmth from the warm pressurization portion of the gas flow, and storing coolth (absence of heat energy) from the cooled expansion portion of the gas flow. As a result, the heat energy is transported from the cooling chamber 64 to the working chamber 66. The end wall 58 is gradually cooled to cryogenic temperatures, while the expander portion 14 in the area around the working chamber 66 is warmed above ambient and liberates the transported heat energy to ambient along with heat energy resulting from the inefficiencies inherent in the operation of the expander 14.

During operation of the expander portion 14, the reciprocating mass is composed of the drive piston 48, spring seat 50, and displacer member 36, along with about one-third of the mass of the springs 52 and 54. This reciprocating mass is controlled in its reciprocation by the spring forces supplied by the springs 52, and 54, along with the pneumatic spring force provided by the pneumatic chamber 49. The pneumatic spring force is determined by the area of the piston member 48, the volume of chamber 49, and the mean operating pressure in the chamber 49. This mean operating pressure will stabilize during operation of the expander portion 14 substantially at the mean value of the sinusoidal pressure wave from the compressor 12. According to the present invention, the spring/mass system described above is selected to be resonant substantially at the operating cyclic rate for the compressor portion 12.

Consequently, the amplitude of reciprocation for the displacer member 36 is as great as possibly can be obtained with a particular amplitude of pressure wave from the compressor portion 12, and this reciprocating motion of the displacer is approximately 90 degrees out of phase with the sinusoidal pressure waveform from the compressor portion 12. Because the quantitative heat flow from the cooling chamber 64 toward the working chamber 66 is effected by the size of the stroke of reciprocation of the displacer member 36, and is maximized when reciprocation of the displacement member 36 is 90 degrees out of phase with the driving pressure waveform from the compressor portion 12, the operation of the present cooler is superior to those conventional coolers which do not operate at near-resonance with the driving compressors of those coolers. That is, after cool down, the present cooler has a superior efficiency of operation in comparison to the pneumatic-piston and spring-centered type of coolers. In other words, the substantially resonant operation of the present cryogenic cooler results in an improved efficiency of operation for the Stirling cycle refrigeration effect produced by the cooler. Also, after cool down and during operation, the present cooler has a superior efficiency of operation in comparison to the conventional spring-driven type of cooler. Even though this latter type of conventional cooler may operate at near-resonance, it has an inherently lower efficiency of operation because of the lower compression ratio created by the volume necessary to house the drive spring.

Another advantage of the present invention arises with respect to cool-down operation. With the conventional spring-centered and pneumatic piston types of coolers, the compressors will over drive the expanders during cool down. This over-driving results in the reciprocating masses of these coolers impacting against the end walls of the expanders and creating noise. In addition to the objectionable noise made by these coolers during cool down, the impacts dissipate energy so that a decreased cooling effectiveness is realized. With the conventional spring-driven type of cooler, the reciprocating mass does not impact the end walls of the expander, but the lower compression ratio of these coolers decreases their cooling effectiveness during cool down.

In contrast to all of the above, the present cryogenic cooler is both quiet and has an increased effectiveness of cooling during cool down. Such is the case because the near-resonant spring/mass system of the present cooler is initially under driven by the compressor when the compressor first begins operation. The spring/mass system thus does not impact the end walls of the expander portion. Further, as the spring/mass system then begins to reciprocate in resonance with the compressor, the stroke of the displace member 36 will approach the maximum stroke which can be achieved with the amplitude of pressure wave provided by the compressor portion, higher than the spring-centered and pneumatic-piston types of coolers . Also, the effective compression ratio of the present cooler will be higher than the spring-driven type of cooler. The net result is that the present cooler is quiet both during cool down and after reaching cryogenic temperatures at the end of the cold finger. The present cooler is also more effective after cool down than all of the conventional cryogenic coolers.

Figure 2:
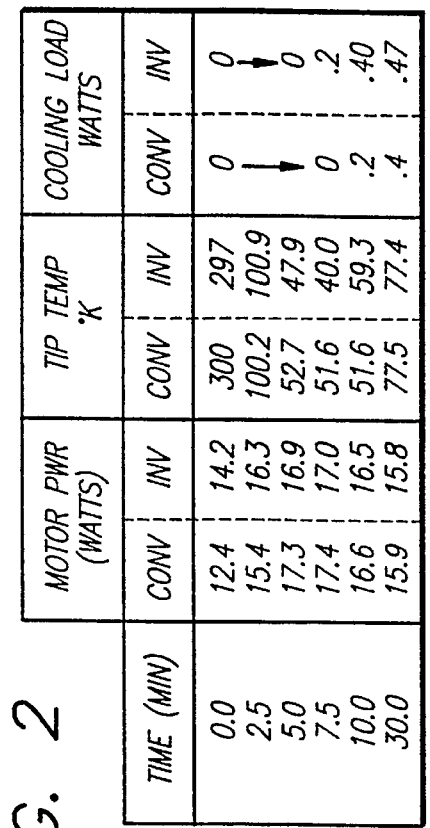

Considering FIG. 2, a composite of exemplary test results for both a conventional spring-centered cryogenic cooler (noted as conventional, or "conv"), and for a cooler embodying the invention (noted as "inv") is set out. The table of FIG. 2 shows that the present cryogenic cooler enjoys both a quicker cool down and a better cooling effectiveness after cool down. The conventional cooler provided 0.4 watts of cooling at 77.5 degrees Kelvin for a driving power input of 15.9 watts. On the other hand, the cooler embodying the present invention provided 0.47 watts of cooling at 77.4 degrees Kelvin for a power input of 15.8 watts. The result is a 17 percent improvement in cooling provided by the invention with an attendant slight decrease in driving power requirement. Also, the cooler embodying the present invention was quiet during and after cool down. The conventional spring-centered cooler was only quiet after cool down, but made the characteristic noise of impact during cool down until steady state cryogenic operation was obtained.

The superiority of the present inventive cooler can be seen also by considering the cool down rate of a conventional cooler and of a cooler embodying the present invention starting from room temperature. With a thermal mass of 1.7 grams, the conventional cooler required 3.11 minutes to cool to 77 degrees Kelvin. On the other hand, a cooler embodying the present invention cooled a thermal mass almost twice as large (3.24 grams) to 77 degrees Kelvin in a nearly equivalent time interval of 3.24 minutes.

In order to further define the present invention, it should be noted that the relationships of the spring/mass system of the cooler may be expressed by mathematical relationships, which are set out below. In the following relationships, the following terms have the indicated meanings: K is a spring constant; V is volume; A is area; P is pressure; and M is mass. The subscripts have the following meanings: d is a drive piston value; D is a displacer value; S is a mechanical spring value; P is a pneumatic spring value; w is a warm end or working volume value; c is a cold end value, and O is a mean operating value. The equivalent mass of the mechanical springs which contributes to the total mass of the reciprocating spring/mass system is taken as about one-third of the mass of the springs 52, 54. "X" is the displacement of the spring/mass system including the drive piston and displacer along the length of the expander portion, which is in the vertical direction, as seen in FIG. 1. "M" is the total mass for the spring/mass system, and includes $M_D$, $M_d$, and $M_s$.

System Dynamics $$M\ddot{x} = (P_w - P_p)A_d - (P_w - P_c)A_D - (K_S + P_P)X \quad \text{EQUATION 1}$$

For most designs, the movement of the drive piston 48, and the change in the volume of chamber 49, is small compared to the total volume of the chamber 49. Consequently, this change in the volume of the chamber 49 is ignored in calculating the equivalent spring constant of the chamber 49 acting on piston 48. Thus:

Equivalent Gas Spring $$K_P = \frac{P_o A_d^2}{V_P} \quad \text{EQUATION 2}$$

Further, the pressure differential acting across the displacer 36 is small and can be treated as a second order damping function. Accordingly, the spring/mass dynamic equation can be written as:

$$\begin{aligned} M\ddot{x} &= (P_w - P_c)A_d + (K_s + K_p)X \quad \text{EQUATION 3} \\ &= (P_w - P_o)A_d \\ &= (P_w - P_o)_{MAX} A_d \cdot \sin w_{ot} \end{aligned}$$

In view of the above, selecting the spring rates for the springs 52, 54 can be done with a view to the other design parameters of the cryogenic cooler according to the relationship:

$$\frac{K_s + K_p}{M} = w_o^2 \quad \text{EQUATION 4}$$

The value $w_o$ is the characteristic operating cyclic rate of the compressor portion 12. Thus, when the springs 52, and 54 are selected to have the appropriate spring rates in view of the desired near-harmonic operation of the expander portion 14 to the compressor portion 12, the advantages of the present invention will be realized. An additional advantage of the present invention when near-harmonic or harmonic relationship of the expander portion 14 to compressor portion 12 is realized is the essentially 90 degree phase angle difference between the displacements of the displacer 36 and the pressure waves from the compressor 12. It is generally recognized that a Stirling cycle cryogenic cooler operates best when this phase angle is as close to 90 degrees as can be achieved. When the expander of the present invention operates in near-harmonic relationship with the compressor portion 14, the phase angle with be close to 90 degrees. A true 90 degree phase angle is achieved when the expander 14 operated in harmonic relationship to the characteristic cyclic operating rate of the compressor portion 12.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A split Stirling cycle cryogenic cooler having portions thereof which operate substantially at resonant frequency to achieve improved cooling performance and quiet operation both during and after cool down from ambient temperatures to cryogenic temperatures, said cryogenic cooler comprising:

a compressor portion cyclically receiving and discharging a flow of pressurized gas via a flow path at a characteristic cyclic rate;

an expander portion having a housing defining a part of said flow path to communicate said cyclic flow of pressurized gas to a working chamber therewithin; a drive piston member reciprocal in said housing and being exposed to both said working chamber to be reciprocally driven by said cyclical flow of pressurized gas, and to gas pressure in a substantially closed pneumatic spring chamber cooperatively defined by said drive piston member and said housing; pressurized gas in said pneumatic spring chamber applying a first pneumatic spring force to said drive piston member; said housing including an elongate tubular extension portion having an end wall and defining a blind bore communicating with said working chamber; an elongate gas displacer member reciprocal in said blind bore and drivingly coupled to said drive piston member for reciprocation in unison therewith; said gas displacer member cooperating with said tubular extension portion to define a cold chamber adjacent to said end wall, and said gas displacer member also including an elongate gas-permeable regenerator matrix of heat-transfer and heat-absorption material providing gas flow communication between said working chamber and said cold chamber through said gas displacer member; a resilient mechanical spring member disposed within said pneumatic spring chamber in isolation from said cyclic gas flow of pressurized gas, said mechanical spring member applying a second spring force to said drive piston member both to center said drive piston member and said gas displacer member relative to said housing, and to add said second spring force to the pneumatic first spring force effective on said drive piston member; said pneumatic first spring force and said mechanical second spring force together providing substantially harmonic reciprocation of said piston member and said gas displacer member at said characteristic cyclic rate and at a substantially 90 degree phase angle with respect to said compressor portion.

2. The split Stirling cycle cryogenic cooler of claim 1 wherein said expander portion further includes a spring seat member drivingly attached to said drive piston member, said mechanical spring including a pair of springs extending in opposite directions from said spring seat member to engage said housing.

3. The split Stirling cycle cryogenic cooler of claim 1 wherein said drive piston member, said gas displacer member, a spring seat member drivingly coupled to said drive piston member, and a certain portion of the mass of said mechanical spring member together define the mass of a resonant spring/mass system, the spring force for which is cooperatively provided by said pneumatic first spring force and said mechanical second spring force.

4. A split Stirling cycle cryogenic cooler of the type including a compressor portion which, at a characteristic cyclic rate of operation, cyclically discharges pressurized gas to, and receives said pressurized gas from, an expander portion of said cryogenic cooler, so as to achieve both greater operating efficiency and decreased noise of operation during and after cool down from ambient temperatures to cryogenic temperatures, said expander portion receiving said cyclic pressurized gas flow to reciprocally drive a gas displacer to transfer heat from one part of said expander portion to another by Stirling cycle operation; said split Stirling cycle cryogenic cooler comprising:

a reciprocating spring/mass system in said expander portion, which spring/mass system includes:

a mass having a drive piston member to which said cyclic pressurized gas flow is applied to reciprocate said gas displacer, said gas displacer, and a certain portion of a resilient mechanical spring; wherein a spring element of the resilient mechanical spring includes:

a combination of spring forces from a combination of a pneumatic spring element and a mechanical spring element, said pneumatic spring element including:

a substantially closed chamber in which a quantity of pressurized gas is captured and to which said drive piston member is exposed to result in said pneumatic spring force, and said mechanical spring element including:

a mechanical spring disposed in said substantially closed chamber and extending between a housing of said expander portion and a spring seat member which is drivingly coupling to both said piston member and said expander portion to also establish a preferred center position of reciprocation therefor with respect to said housing, wherein the combination of pneumatic spring element and mechanical spring element has a spring rate such that said spring/mass system has a resonant frequency substantially matching said characteristic cyclic rate of said compressor portion.

5. The split Stirling cycle cryogenic cooler of claim 4 wherein said spring/mass system is operable in cyclical reciprocation at a phase angle of substantially 90 degrees with respect to said compressor portion.

6. A method of operating a split Stirling cycle cryogenic cooler so as to minimize noise generation during start up and cool down of said cooler from ambient to cryogenic temperatures, said cryogenic cooler being of the type having a compressor portion cyclically receiving and discharging a flow of pressurized gas to drive an expander portion which receives said cyclic pressurized gas flow, said expander portion including a drive piston member reciprocating in response to said cyclic flow of pressurized gas and driving a gas displacer member with a regenerator matrix therein in unison with said drive piston member to effect Stirling cycle operation within said expander thereby to generate cryogenic temperatures at a portion of said expander portion, said method including the steps of:

starting operation of said compressor portion;

transferring said cyclic pressurized gas flow from said compressor portion to said expander portion; and utilizing said cyclic flow of pressurized gas to begin operation of said expander portion and reciprocation of said drive piston member and said gas displacer member;

underdriving said drive piston member and said gas displacer member in unison in response to said cyclic flow of pressurized gas during an initial time interval following start up of said expander portion, thereby to insure that neither said drive piston member nor said gas displacer member impact a housing of said expander portion to generate noise during start up and cool down of said cryogenic cooler.

7. The method of claim 6 further including the step of bringing said drive piston member and said expander member into a cyclic condition of reciprocation in substantial resonance with said compressor portion following said initial time interval.

8. The method of claim 7 additionally including the step of maintaining a phase angle difference of substantially 90 degrees between said drive piston member and said gas displacer member moving in unison, and said compressor portion.

9. The method of operating a split Stirling cycle cryogenic cooler of the type having a compressor portion cyclically receiving and discharging a flow of pressurized gas at a characteristic cyclic rate to drive an expander portion effecting Stirling cycle refrigeration within said expander portion and generating cryogenic temperatures at a part of said expander portion, the expander portion including a drive piston member exposed to and reciprocating in a housing of said expander portion in response to said cyclic flow of pressurized gas, and a gas displacer member which is drivingly coupled with said drive piston member for reciprocation in unison therewith within said housing, said gas displacer member having a gas-permeable regenerator matrix therein communicating gas flow between the cooled part of said expander and a warmed part thereof, said method comprising the steps of:

providing a resilient mechanical spring drivingly coupled to and applying a first spring force to both said drive piston member and to said gas displacer member;

isolating said mechanical spring from said cyclic flow of pressurized gas;

providing a pneumatic chamber capturing a quantity of pressurized gas;

exposing said drive piston member to pressurized gas in said pneumatic chamber to exert a pneumatic second spring force on said drive piston member and said gas displacer member;

defining a reciprocating mass system within said expander portion which reciprocating mass system includes said drive piston member, said gas displacer member, a portion of said mechanical spring, and any spring seat member drivingly coupling said mechanical spring to said drive piston member; and selecting the combination of said first and second spring forces so that said spring forces and reciprocating mass system define a spring/mass system which is substantially resonant at said cyclic rate.

* * * * *